US012358171B2

(12) United States Patent
Pandis et al.

(10) Patent No.: US 12,358,171 B2
(45) Date of Patent: Jul. 15, 2025

(54) COMBS FOR HAIR CUTTING APPLIANCES

(71) Applicant: KONINKLIJKE PHILIPS N.V., Eindhoven (NL)

(72) Inventors: Spyridon Errikos Pandis, Groningen (NL); Luca Iaccarino, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 571 days.

(21) Appl. No.: 17/298,683

(22) PCT Filed: Dec. 30, 2019

(86) PCT No.: PCT/EP2019/087134
§ 371 (c)(1),
(2) Date: Jun. 1, 2021

(87) PCT Pub. No.: WO2020/141152
PCT Pub. Date: Jul. 9, 2020

(65) Prior Publication Data

US 2022/0040872 A1 Feb. 10, 2022

(30) Foreign Application Priority Data

Jan. 4, 2019 (EP) .................................... 19150364

(51) Int. Cl.
*B26B 19/20* (2006.01)
*A45D 24/36* (2006.01)
*B26B 19/38* (2006.01)

(52) U.S. Cl.
CPC .............. *B26B 19/20* (2013.01); *A45D 24/36* (2013.01); *B26B 19/3813* (2013.01)

(58) Field of Classification Search
CPC ....... B26B 19/00; B26B 19/20; B26B 19/205; B26B 19/38; B26B 19/3806; B26B 19/3813; A45D 24/36
See application file for complete search history.

(56) References Cited

U.S. PATENT DOCUMENTS 1,662,373 A * 3/1928 Widdows ............... A45D 24/36 132/129
2,864,162 A 12/1958 MacDonald
(Continued)

FOREIGN PATENT DOCUMENTS

EP 1875828 A2 1/2008
EP 2465652 A1 6/2012
(Continued)

OTHER PUBLICATIONS

International Search Report and Written Opinion Dated Mar. 31, 2020 for International Application No. PCT/EP2019/087134 Filed Dec. 30, 2019.

*Primary Examiner* — Adam J Eiseman
*Assistant Examiner* — Richard D Crosby, Jr.

(57) ABSTRACT

A comb for a hair cutting appliance is described. The comb includes a first comb portion defining a comb surface to be held against a user's skin; a second comb portion having a plurality of comb teeth projecting from the first comb portion in a first direction. The first direction has a component in a direction perpendicular to the comb surface. The plurality of comb teeth are spaced apart from one another in a second direction, and the second direction is parallel to the comb surface. The comb also includes a third comb portion with one or more further comb teeth extending in a third direction. The third direction has a component in a direction perpendicular to the comb surface. The width of each of the further comb teeth in the second direction is approximately equal to the width of the spaces between the comb teeth.

20 Claims, 4 Drawing Sheets

(56) References Cited

U.S. PATENT DOCUMENTS

| | | | | | |
|---|---|---|---|---|---|
| 3,041,726 | A * | 7/1962 | Hitson | B26B 19/20 30/201 |
| 3,638,665 | A * | 2/1972 | Staffas, Sr. | A45D 24/36 132/129 |
| 4,505,283 | A * | 3/1985 | Pischdotchian | B26B 21/12 132/126 |
| 4,614,036 | A | 9/1986 | Haraguchi | |
| 5,185,931 | A | 2/1993 | Fujikawa | |
| 5,937,526 | A * | 8/1999 | Wahl | B26B 19/20 30/200 |
| 6,079,103 | A * | 6/2000 | Melton | B26B 19/20 30/79 |
| D512,532 | S * | 12/2005 | Akahori | D28/53 |
| D530,858 | S * | 10/2006 | Kling | D28/54 |
| 7,918,029 | B2 * | 4/2011 | Melton | B26B 19/3813 30/200 |
| D881,471 | S * | 4/2020 | Zhang | D28/54 |
| 10,661,459 | B2 * | 5/2020 | Vonk | B26B 19/388 |
| D887,635 | S * | 6/2020 | Zoot | D28/21 |
| D887,636 | S * | 6/2020 | Zoot | D28/21 |
| 10,946,537 | B2 * | 3/2021 | Danmola | B26B 19/20 |
| D947,455 | S * | 3/2022 | Jiang | D28/54 |
| 11,420,349 | B2 * | 8/2022 | Laccarino | B26B 19/3826 |
| D990,047 | S * | 6/2023 | Franklin | D28/54 |
| D990,048 | S * | 6/2023 | Franklin | D28/54 |
| 2002/0073552 | A1 * | 6/2002 | McCambridge | B26B 19/44 30/216 |
| 2009/0032043 | A1 * | 2/2009 | Gaugler | A45D 24/10 132/148 |
| 2013/0199346 | A1 * | 8/2013 | Psimadas | B26B 21/225 83/13 |
| 2015/0217468 | A1 | 8/2015 | Dryfhout | |
| 2017/0008180 | A1 * | 1/2017 | Nab | B26B 19/44 |
| 2017/0341245 | A1 * | 11/2017 | Nayna | B26B 19/20 |
| 2018/0368548 | A1 * | 12/2018 | Park | A45D 24/02 |
| 2021/0008739 | A1 * | 1/2021 | Iaccarino | B26B 19/20 |
| 2021/0008740 | A1 * | 1/2021 | Iaccarino | B26B 19/22 |
| 2021/0122070 | A1 * | 4/2021 | Iaccarino | B26B 19/20 |
| 2022/0040872 | A1 | 2/2022 | Pandis | |

FOREIGN PATENT DOCUMENTS

| | | | |
|---|---|---|---|
| EP | 3403779 | A1 | 11/2018 |
| WO | 2006/063370 | A1 | 6/2006 |
| WO | 2015028330 | A1 | 3/2015 |
| WO | 2015/149993 | A1 | 10/2015 |
| WO | 2017/084897 | A1 | 5/2017 |

* cited by examiner

COMBS FOR HAIR CUTTING APPLIANCES

CROSS REFERENCE TO RELATED APPLICATIONS

This application is the U.S. National Phase application under 35 U.S.C. § 371 of International Application No. PCT/EP2019/087134 filed Dec. 30, 2019, which claims the benefit of European Patent Application Number 19150364.8 filed Jan. 4, 2019. International Application No. PCT/EP2019/087134 and European Patent Application Number 19150364.8 are hereby incorporated by reference herein.

FIELD OF THE INVENTION

The present disclosure relates to a comb for a hair cutting appliance.

BACKGROUND OF THE INVENTION

Hair cutting appliances often comprise a comb mounted on the hair cutting appliance. The comb comprises a plurality of comb teeth that are configured to guide hairs towards cutting blades of the hair cutting appliance.

Some hair cutting appliances aim to collect hairs that have been cut by the cutting blades of the hair cutting appliance, to prevent the hairs from spilling out of the hair cutting appliance as they are cut and causing mess.

SUMMARY OF THE INVENTION

According to an aspect of the present disclosure, there is provided a comb for a hair cutting appliance, the comb comprising.

- a first comb portion defining a comb surface to be held against a user's skin;
- a second comb portion comprising a plurality of comb teeth projecting from the first comb portion in a first direction, the first direction having a component in a direction perpendicular to the comb surface, wherein the plurality of comb teeth are spaced apart from one another in a second direction, the second direction being parallel to the comb surface; and
- a third comb portion comprising one or more further comb teeth extending in a third direction, the third direction having a component in a direction perpendicular to the comb surface, wherein the further comb teeth are arranged on the same side of the comb surface as the comb teeth, and wherein the further comb teeth extend further forwards, in a direction perpendicular to the first and second directions e.g. a hair cutting direction, than the comb teeth and/or the comb teeth extend further rearwards, in the direction perpendicular to the first and second directions, than the further comb teeth.

The width of the further comb teeth in the second direction may be equal, e.g. approximately equal, to the width of the spaces between the comb teeth, e.g. in the second direction. The widths of the further comb teeth may be equal, e.g. approximately equal, to the width of the comb teeth. Alternatively, the widths of the further comb teeth may be different from, e.g. narrower or wider than the widths of the comb teeth and/or the spaces between the comb teeth.

The arrangement of the comb teeth and further comb teeth may improve the ability of the comb to retain hairs, as the comb teeth and further comb teeth can cooperate to capture cut hairs leaving the hair cutting appliance, without restricting the passage of hairs through the second and third comb portions to reach the hair cutting appliance.

Furthermore, because the further comb teeth extend further forwards than the comb teeth and/or the comb teeth extend further rearwards than the further comb teeth, manufacturability of the comb can be improved without reducing hair capturing performance of the comb. In particular, the aspect ratio of portions of a mould for forming the comb teeth and further comb teeth can be reduced.

The second comb portion may be for guiding hair towards the hair cutting appliance when the hair cutting appliance is moved in a hair cutting direction.

The further comb teeth may be positioned at least partially, or substantially completely, between the pairs of the comb teeth. In other words, one or more of the further comb teeth may be positioned at least partially between, or substantially completely between, adjacent ones of the comb teeth in the second direction.

Positioning the further comb teeth between the comb teeth may improve the hair capturing performance of the comb, by reducing the area through which cut hairs can leave the hair cutting appliance without contacting the comb.

Each of the further comb teeth may be positioned between different pairs of the comb teeth. Alternatively, two or more of the further comb teeth may be positioned at least partially between the same pair of comb teeth.

Each of the further comb teeth may be aligned, e.g. at least partially aligned, with one of the spaces between the plurality of comb teeth, e.g. in the second direction. The number of further comb teeth may be equal to the number of spaces between the plurality of comb teeth.

The further comb teeth may be positioned at least partially, or completely, forwards of the comb teeth in the direction perpendicular to the first and second directions, e.g. in the hair cutting direction of the hair cutting appliance. For example, cross-sections of the comb teeth and the further comb teeth, e.g. in a plane perpendicular to the first or third directions, may not overlap in the direction perpendicular to the first and second direction.

Positioning the further comb teeth forwards of the comb teeth may allow the width of gaps between the comb teeth and further comb teeth to be reduced without affecting the passage of hairs through the comb to reach the hair cutting appliance. Furthermore, positioning the further comb teeth forwards of the comb teeth can further improve manufacturing of the comb. In particular, it may enable the comb teeth and further comb teeth to be formed by different elements of a mould and/or in different manufacturing stages. When the further comb teeth are positioned forwards of the comb teeth, the third comb portion may be provided on a separate component to the first and/or second comb portions, which may be coupled to the first and/or second comb portions.

The first and third directions may be parallel. In other words, the comb teeth and further comb teeth may extend in directions parallel to one another. For example, the comb teeth may extend in a direction angled at less than 5 degrees or 10 degrees relative to the further comb teeth.

Cross-sectional shapes of the comb teeth and the further comb teeth, e.g. in a plane perpendicular to the first or third direction or in planes perpendicular to the first and third directions respectively, may be substantially the same. For example, cross-sectional shapes of the comb teeth and the further comb teeth may be triangular or wedge shaped, increasing in thickness from the front of the comb teeth to the rear of the comb teeth, e.g. in the direction perpendicular to the first and second directions, and may have sharp or rounded corners.

When the further comb teeth are triangular or wedge shaped in cross-section, the passage of hair through the comb to the hair cutting appliance may be improved as the further comb teeth may act to guide hairs through gaps between the comb teeth and further comb teeth.

The comb teeth and/or the further comb teeth may comprise hair lifting portions extending forwards in a direction parallel to the comb surface. The hair lifting portion may be for lifting hairs when the comb is moved in the direction parallel to the comb surface, e.g. in the hair cutting direction. The hair lifting portions may comprise ramp shaped elements extending forwards from the comb teeth in the direction parallel to the comb surface. For example, one of the comb teeth and the further comb teeth may comprise hair lifting portions, and the other of the comb teeth and the further comb teeth may not comprise hair lifting portions. Alternatively, both the comb teeth and the further comb teeth may comprise hair lifting portions.

The second comb portion may be integrally formed with the first comb portion. The third comb portion may be couplable, e.g. detachably couplable, to the first and/or second comb portions. Alternatively, the third comb portion may be formed integrally with the first and/or second comb portions.

The further comb teeth may have a tooth pitch equal, e.g. approximately equal, to a tooth pitch of the comb teeth. Alternatively, the tooth pitch of the further comb teeth may be different, e.g. smaller or larger than, the tooth pitch of the comb teeth.

The second comb portion may further comprise a connecting bar extending across distal ends of the comb teeth. The comb teeth may be coupled together in a spaced apart arrangement by the connecting bar. The comb teeth may be coupled to the first comb portion by the connecting bar.

A minimum gap size between the comb teeth and the further comb teeth, e.g. between cross-sectional shapes of the comb teeth and further comb teeth in a plane perpendicular to the first or third direction, may be equal to or greater than the width of the spaces between the comb teeth, e.g. when the third comb portion is coupled to the second comb portion. For example, the minimum gap size may be greater than or equal to 0.1 mm. The minimum gas size may be less than or equal to 2.5 mm.

The gap size between the further comb teeth and an adjacent one of the comb teeth, in the second direction, may be greater than or equal to 0.1 mm and may be less than or equal to 2.5 mm.

A hair cutting system may comprises a hair cutting appliance comprising a plurality of blades for cutting hair; and the above-mentioned comb, wherein the comb is couplable, e.g. detachably couplable, to the hair cutting appliance.

The hair cutting appliance may comprise a cutting blade and a guard blade. The cutting blade may comprise a comb of cutting elements which cooperate with teeth of the guard blade to cut hairs received between the guard blade teeth. A pitch of the comb teeth may be equal, e.g. approximately equal, to a pitch of the teeth of the guard blade, which may improve the ability of the comb to guide hairs towards the cutting elements and thereby improve the hair cutting performance of the hair cutting system.

The hair cutting appliance may comprise a body. The blades, e.g. the cutting blade and the guard blade, may protrude from a distal end of the body. The body of the hair cutting appliance may comprise a chamber for receiving hairs but by the hair cutting appliance. The body may comprise a wall opposite to the comb teeth. The wall may extend in a direction with a component parallel to the first direction.

An opening, e.g. into the hair collection chamber, may be formed in the wall for receiving hairs cut by the hair cutting appliance. The opening may be formed adjacent to the blades of the hair cutting appliance. The opening may extend from the blades in a direction with a component in the first direction. A height of the opening in the first direction, e.g. the height of the opening projected into a plane perpendicular to the first direction, may be approximately equal to or less than the length of the second comb portion in the first direction.

To avoid unnecessary duplication of effort and repetition of text in the specification, certain features are described in relation to only one or several aspects of embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE EMBODIMENTS

Figure 1:
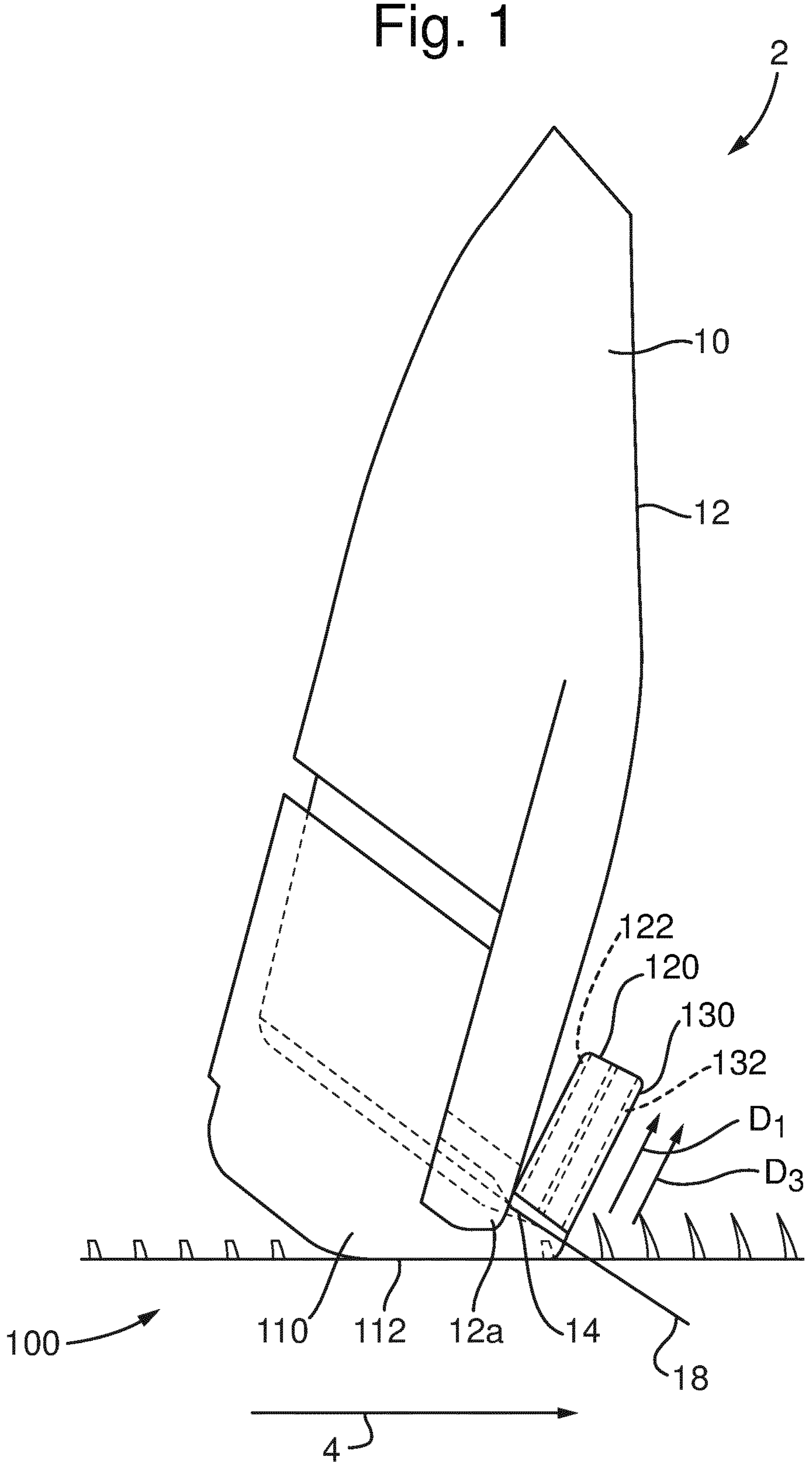
FIG. 1 is a schematic side view of a hair cutting system.

With reference to FIG. 1, a hair cutting system 2, according to the present disclosure, comprises a hair cutting appliance 10 and a comb 100.

The hair cutting appliance 10 comprises a body 12 and a plurality of blades 14. As depicted, the blades 14 protrude from a distal end 12*a* of the body 12 of the hair cutting appliance 10.

Figure 2:
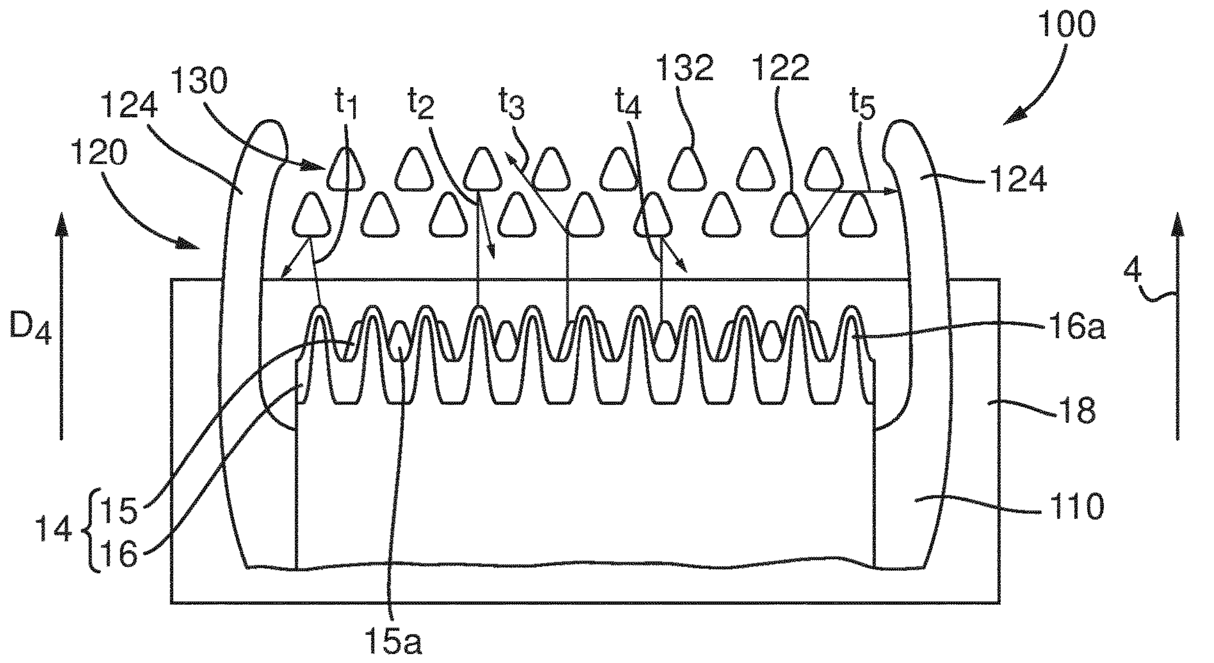
FIG. 2 is a cross-section view of the cutting blades and comb of the hair cutting system shown in FIG. 1.

As shown in FIG. 2, the blades 14 comprise a cutting blade 15 and a guard blade 16. The cutting blade 15 comprises a plurality of cutting elements 15*a* arranged to form a comb of cutting elements. The cutting elements cooperate with guard blade teeth 16*a* of the guard blade 16 to cut hairs received between the guard blade teeth 16*a*. The cutting blade 15 and guard blade 16 define a cutting plane 18 in which hairs are cut by the hair cutting appliance 10.

In use of the hair cutting system 2, the hair cutting appliance 10 is moved over the skin of a user in a hair cutting direction 4, such that the user's hairs are brought into contact with the blades 14 and are received between the guard blade teeth 16*a*. The received hairs are cut in the cutting plane 18, as depicted in FIG. 1.

As shown in FIGS. 1 and 2, the comb 100 is couplable, e.g. detachably couplable, to the hair cutting appliance 10. The comb 100 comprises a first comb portion 110 and a second comb portion 120. In the arrangement shown in FIG.

1, the comb 100 is coupled to the body 12 of the hair cutting appliance 10 at the first comb portion 110. In other arrangements, the comb 100 may be coupled to the hair cutting appliance at the second comb portion 120 or a further portion of the comb.

The first comb portion 110 comprises a comb surface 112, which is to be placed against the skin of the user during use of the hair cutting appliance. In some arrangements, the position of the comb surface 112 relative to the blades 14 may be selectively adjustable in order to adjust the length to which hairs are cut by the hair cutting appliance 10.

The second comb portion 120 comprises a plurality of comb teeth 122 configured to lift and support hairs, to guide the hairs towards the blades 14 of the hair cutting appliance 10 in use of the hair cutting system 2. The comb teeth 122 extend, e.g. from the comb surface 112, in a first direction $D_1$, which may be perpendicular to, e.g. between 80 degrees and 100 degree relative to, the cutting plane 18 defined by the blades 14, when the comb 100 is coupled to the hair cutting appliance 10. The first direction $D_1$ has a component in a direction perpendicular to the comb surface 112.

The comb teeth 122 are spaced apart from one another across a lateral width of the comb 100. More particularly, the comb teeth 122 are spaced apart from one another in a second direction $D_2$, the second direction being parallel to the comb surface 112.

As depicted in FIG. 1, the second comb portion 120 may be formed integrally with the first comb portion 110. In other arrangements, the second comb portion 120 may be movably and/or detachable coupled to the first comb portion 110.

The comb 100 is coupled to the hair cutting appliance 10 such that the comb teeth 122 are positioned forwards of the blades 14 of the hair cutting appliance 10 in the hair cutting direction 4.

The second comb portion 120 further comprises side walls 124. As shown in FIG. 2, the side walls 124 are spaced apart from the plurality of comb teeth 122 to either lateral side of the comb teeth 122, e.g. in the second direction $D_2$. The side walls 124 are at least partially aligned within the comb teeth 122 in a fourth direction $D_4$ having a component parallel to the comb surface 112 and perpendicular to the second direction $D_2$. For example, the fourth direction $D_4$ may be parallel to the cutting plane 18 and/or the hair cutting direction 4.

The side walls 124 extend in the first direction $D_1$ For example, the side walls 124 may extend a distance in the first direction $D_1$ greater than or equal to the length of the comb teeth 122 in the first direction $D_1$. As shown in FIG. 1, the side walls 124 may be aligned with the comb teeth in first direction $D_1$. In other words, the side walls may overlap, e.g. completely overlap, with the comb teeth 122 in the first direction.

The comb 100 may further comprise a connecting bar 126 extending across distal ends of the comb teeth 122. The comb teeth may be coupled to the connecting bar 126 at distal ends of the comb teeth. Additionally or alternatively, the connecting bar 126 may be coupled to the side walls 124 of the second comb portion 120 and may extend across the second comb portion 120 of the comb between the side walls. The connecting bar 126 may improve the rigidity of the comb teeth 122.

The comb teeth 122 may be coupled together, e.g. in the spaced apart arrangement, by the connecting bar 126. In some arrangements, the comb teeth 122 may be coupled to the first comb portion 110 via the connecting bar 126 and side walls 124. Additionally or alternatively, the comb teeth 122 may be coupled to the first comb portion 110, e.g. at proximal ends of the comb teeth 122.

The comb 100 further comprises a third comb portion 130. The third comb portion 130 comprises a plurality of further comb teeth 132. The further comb teeth 132 are spaced apart from one another across the lateral width of the comb 100, e.g. in the second direction $D_2$. A tooth pitch of the further comb teeth 132 may be the same as a tooth pitch of the comb teeth 122. Alternatively, the tooth pitch of the further comb teeth may be different from, e.g. greater or smaller than, the tooth pitch of the comb teeth 122.

Figure 3:
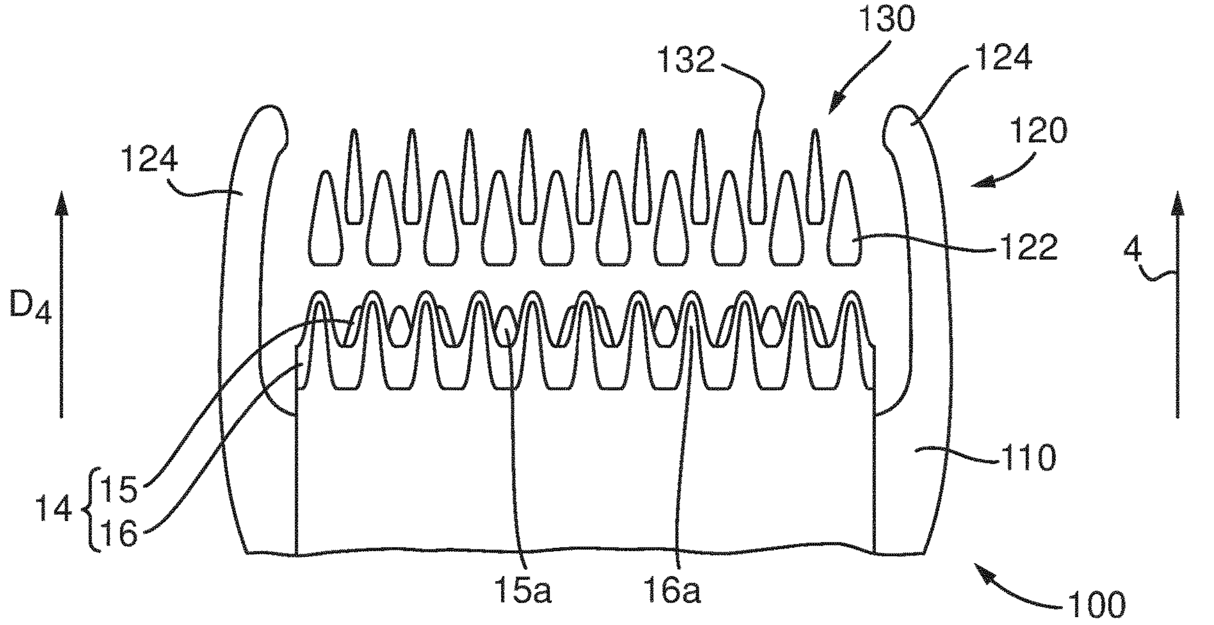
FIG. 3 is a cross-section view of the cutting blades and comb of another hair cutting system.

As shown in FIGS. 2 and 3, the tooth pitch of the comb teeth and/or the further comb teeth may be approximately equal to the pitch of the guard blade teeth **16*a* of the guard blade 16. For example, the number of teeth may vary by less than 3 teeth, or less than 2 teeth, across the width of the hair cutting appliance 10. In one arrangement, the tooth pitch of the comb teeth is approximately equal to the pitch of the guard blade teeth 16*a* of the guard blade 16 and the tooth pitch of the further comb teeth is different from, e.g. smaller than, the pitch of the guard blade teeth 16*a* of the guard blade 16**.

The further comb teeth 132 extend, e.g. between longitudinal ends of the comb teeth, in a third direction $D_3$. The third direction $D_3$ has a component in a direction perpendicular to the comb surface. The third direction $D_3$ may be perpendicular to, e.g. between 80 degrees and 100 degree relative to, the cutting plane 18 defined by the blades 14 when the comb 100 is coupled to the hair cutting appliance 10. In the arrangement shown in FIGS. 1 and 2, the third direction $D_3$ is parallel to, e.g. angled by less than 5 degrees relative to, the first direction $D_1$.

As shown in FIGS. 2 and 3, the further comb teeth 132 extend further forwards, in the fourth direction $D_4$ (perpendicular to the first and third directions $D_1$, $D_3$), than the comb teeth 122. Additionally or alternatively, the comb teeth 122 may extend further rearwards, in the fourth direction $D_4$, than the further comb teeth 132.

As shown in FIG. 2, the further comb teeth 132 may be positioned, forwards the comb teeth 122 in the fourth direction $D_4$. In other words, cross-sections of the comb teeth 122 and the further comb teeth 132, e.g. in a plane perpendicular to the first or third directions as depicted in FIG. 2, may not overlap in the fourth direction $D_4$, e.g. at any position along the length of the further comb teeth 132.

Alternatively, as depicted in FIG. 3, the comb teeth 122 and the further comb teeth 132 may partially overlap in the fourth direction $D_4$.

As shown in FIG. 2, the cross-sectional shape of the further comb teeth 132 may be triangular or wedge shaped. In other words, a width of the cross-sectional shape may be narrower at or towards the front of the further comb teeth, e.g. in the fourth direction, than at or towards the rear of the further comb teeth 132.

The cross-sectional shape of the comb teeth 122, e.g. in a plane perpendicular to the first direction $D_1$, may be substantially the same as the cross-sectional shape of the further comb teeth, e.g. in a plane perpendicular to the first direction $D_1$ or the third direction $D_3$. Alternatively, as shown in FIG. 3, the cross-sectional shape of the comb teeth 122 may differ from the cross-sectional shape of the further comb teeth 132.

The further comb teeth 132 may be aligned, e.g. at least partially aligned, with the spaces between the comb teeth 122, e.g. in the second direction $D_2$. The widths of the further comb teeth 132, e.g. in the second direction $D_2$, may be substantially equal to the widths of the spaces between the comb teeth. Alternatively, the widths of the further comb teeth 132 may be different from, e.g. wider or narrower than the comb teeth.

The shape and size, e.g. width, of the further comb teeth 132 may be configured such that a size of a gap between the comb teeth and the adjacent one or ones of further comb teeth in the second direction $D_2$ is greater than or equal to 0.1 mm. The size of the gap may be less than or equal to 2.5 mm.

In some arrangements, the shape and size, e.g. width, of the further comb teeth 132 may be configured such that a size of a minimum gap between the comb teeth 122 and the further comb teeth, e.g. the shortest distance between a particular comb tooth and the further comb tooth adjacent to the particular comb tooth, is greater than or equal to the width of the spaces between the comb teeth 122. Additionally or alternatively, the size of the minimum gap may be greater than or equal to 0.1 mm and/or may be less than or equal to 2.5 mm.

As shown in FIGS. 2 and 3, the side walls 124 of the second comb portion may extend forwards of the comb teeth 122 in the fourth direction $D_4$, and may extend forwards of the further comb teeth 132 in the fourth direction $D_4$. Additionally, the side walls 124 may extend rearwards of the comb teeth 122 in the fourth direction $D_4$. In some arrangements, the side walls 124 may extend from the rear most extent of the comb teeth 122, or further rearwards, up to, or forwards of, the forward most extent of further comb teeth 132 in the fourth direction $D_4$. A width of the connecting bar 126 in the fourth direction $D_4$ may be equal to the width of the side walls 124 in the fourth direction $D_4$.

The hair cutting system 2 may be configured to reduce mess caused during hair trimming by capturing hairs that have been cut by the hair cutting appliance 10.

When the hairs are cut, some of the hairs may be projected forwards from the blades 14 in the hair cutting direction 4. As depicted in FIG. 2, cut hairs leaving the blades 14 may follow trajectories $t_1$, $t_2$, $t_3$, $t_4$, $t_5$ having a forwards component in the hair cutting direction 4. As shown, some of the hairs that are projected forwards from the blades 14 may pass through the spaces between the comb teeth 122 and may collide with the further comb teeth 132. The hairs colliding with the further comb teeth 132 may be deflected backwards towards the hair cutting appliance 10 to be retained by the hair cutting system 2, as described below.

Some of the hairs that are projected forwards may collide with or be deflected into the side walls 124, which may capture the hairs or deflect the hairs back towards the hair cutting appliance 10. In a similar may, some of the hairs may collide with or be deflected into the connecting bar 126, which may capture the hairs or deflect the hairs back towards the hair cutting appliance 10.

Figure 4:
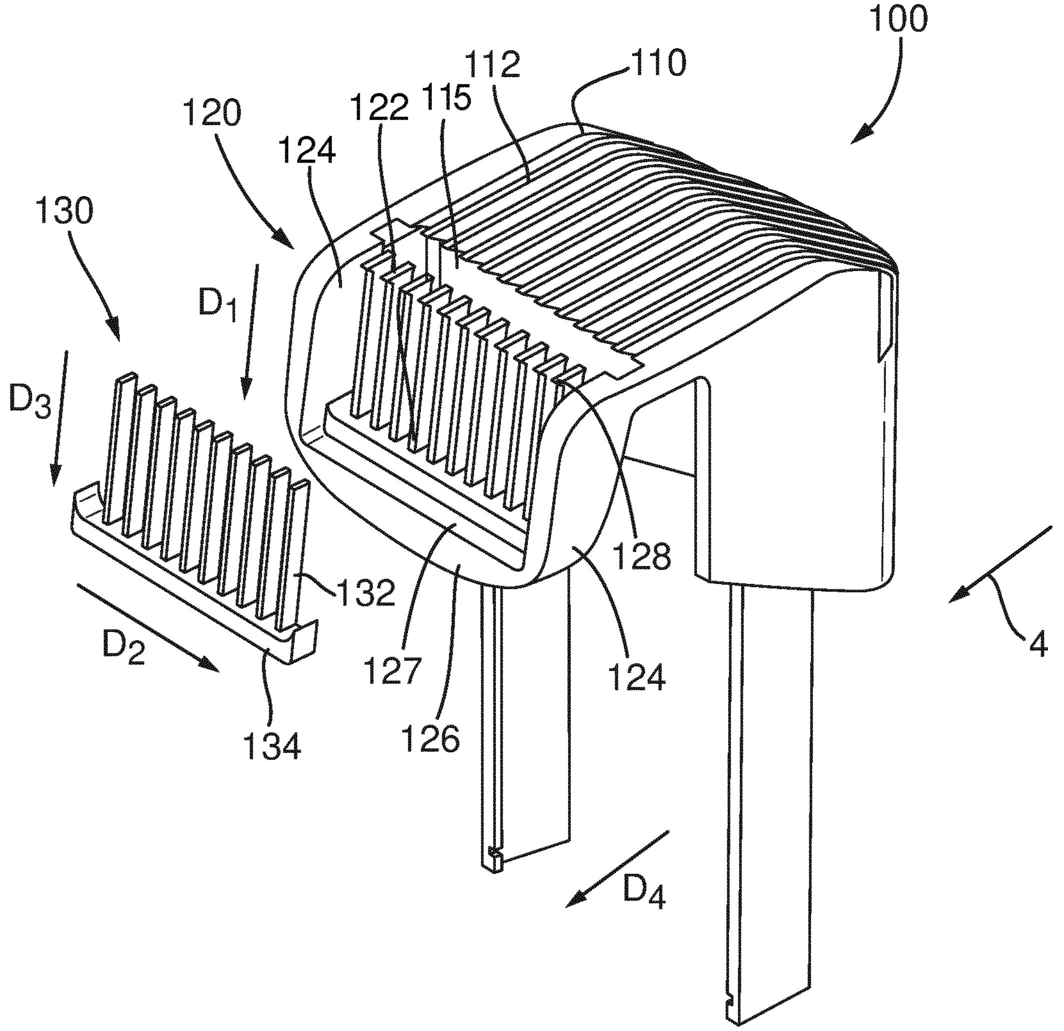
FIG. 4 is a perspective exploded view of a comb for a hair cutting appliance.

In the arrangements shown in FIGS. 1, 2 and 3, the third comb portion 130 is formed integrally with the second comb portion 120. However, as depicted in FIG. 4, in other arrangements, the third comb portion 130 may be detachably coupled to the first and/or second comb portions 110, 120. As shown, the third comb portion 130 may comprise a coupling portion 134 configured to couple to a corresponding coupling portion 127 of the second comb portion 120.

As shown in FIG. 4, the second comb portion 120 may further comprise hair lifting portions 128 extending forwards from the comb teeth 122 in a direction parallel to the comb surface, e.g. forwards in the hair cutting direction 4. The hair lifting portions 128 may comprise ramp shaped projections having a pointed tips and that increase in height, e.g. in a direction perpendicular to the comb surface 112, towards the comb teeth 122, e.g. in the hair cutting direction.

In use of the hair cutting system 2, the pointed tips of the hair lifting portions 128 can be moved beneath hairs lying close to the surface of the skin, which are then raised as the comb moves forwards in the hair cutting direction 4 and the hairs ride up the ramped shape of the hair lifting portions 128. The hair lifting portions 128 thereby act to lift hairs during use of the hair cutting system so that the hairs can be cut more easily by the blades 14.

In the arrangement shown in FIG. 4, the hair lifting portions 128 are formed on the second comb portion 120 projecting from the comb teeth 122. However, in other arrangements, hair lifting portions may additionally or alternatively be formed on the third comb portion 130, e.g. projecting from the further comb teeth 132. For example, when the further comb teeth 132 extend further forwards than the comb teeth in the fourth direction, hair lifting portions may be formed on the third comb portion 130.

In the arrangement shown in FIG. 4, the comb teeth 122 are not connected to the first comb portion at proximal ends of the comb teeth, such that a gap 115 is formed, e.g. in the comb surface 112, between the first comb portion 110 and the comb teeth 122. The gap 115 allows the blades 14 of the hair cutting appliance 10 to be positioned closer to the comb surface 112, when the comb 100 is coupled to the hair cutting appliance, so that hair can be cut to a shorter length. However, in other arrangements the gap may not be provided. For example, the comb teeth 122 may be coupled to the first comb portion 110 at proximal ends of the comb teeth.

Figure 5:
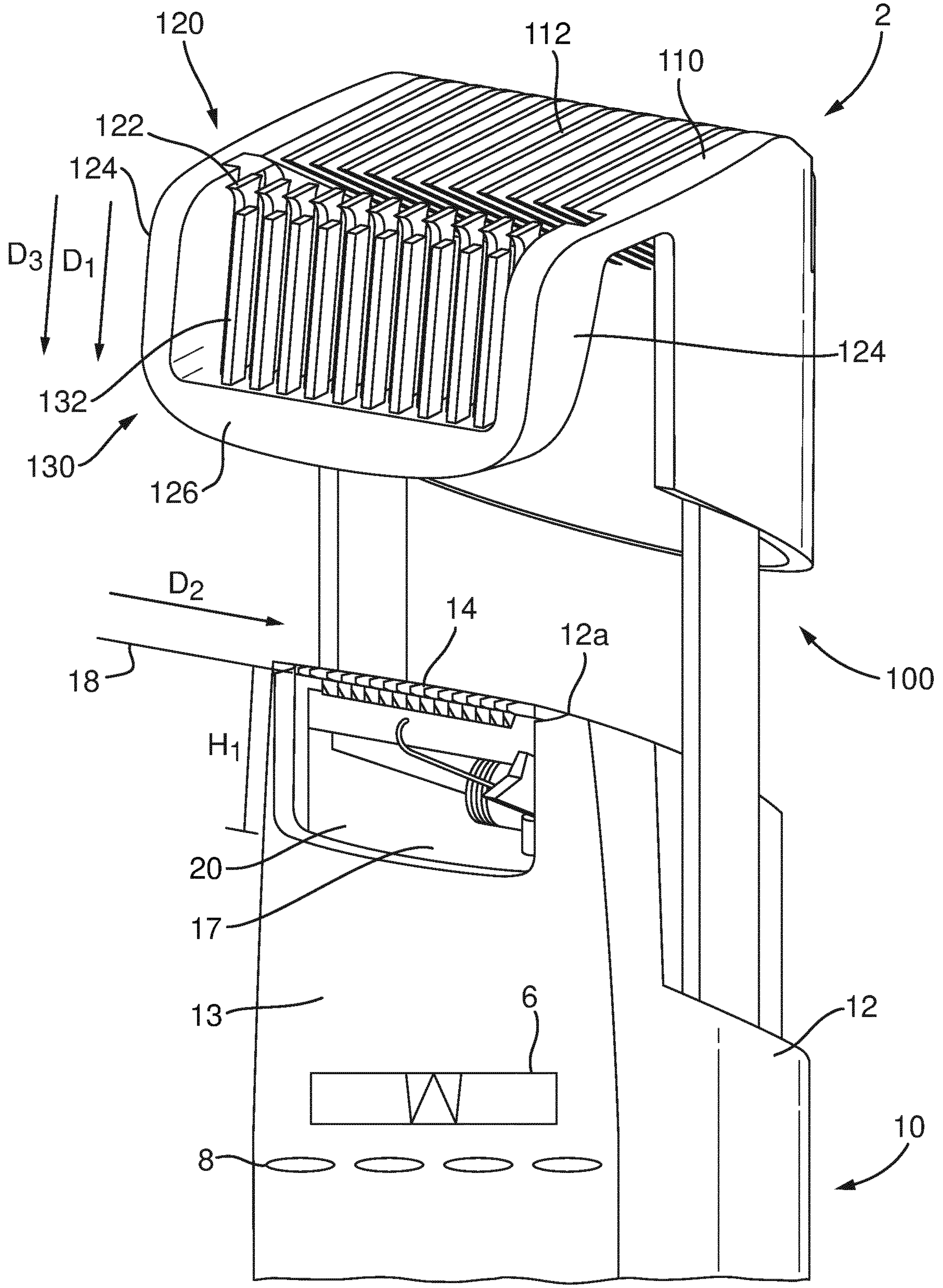
FIG. 5 is a perspective view of a hair cutting system according to another arrangement of the disclosure.

With reference to FIG. 5, a hair collection chamber 17 may be formed within the body 12 of the hair cutting appliance for receiving hairs that are cut by the blades 14. An opening 20 into the hair collection chamber 17 may be formed in a front wall 13 of the body 12 of the hair cutting appliance. The front wall 13 being arranged opposite to the comb teeth 122 and facing the comb teeth 122 when the comb 100 is coupled to the hair cutting appliance 10.

As depicted, the opening 20 may extend up to the distal end 12*a* of the body 12 of the hair cutting appliance 10, such that at least a portion of the blades 14 project form the body 12 through the opening 20. Alternatively, the opening 20 may be formed adjacent, e.g. directly adjacent, to the blades 14 of the hair cutting appliance. A height $H_1$ of the opening may be sufficiently large to allow all, e.g. more than 85%, more than 90% or more than 95%, of the hairs that are cut by the blades 14 to pass into the hair collection chamber 17.

As described above, cut hairs may initially be projected forwards from the blades 14 and may be deflected by the comb 100 back towards the hair cutting appliance 10. The height $H_1$ of the opening 20 may therefore be made sufficiently large to allow hairs that be been deflected by the comb 100 to pass into the hair collection chamber 17. In particular, the height $H_1$ of the opening, e.g. from the cutting plane 18, may be approximately equal to the length of the comb teeth 122 or the second comb portion 120 in the first direction $D_1$.

The hair cutting appliance 10 may further comprise a fan or pump 6 configured to draw air though the opening 20 into the hair collection chamber 17. Drawing air into the hair collection chamber 17 may encourage cut hairs to enter the hair collection chamber 17. One or more vent holes 8 may be formed in the body 12 for the air drawn in by the fan or pump 6 to leave the hair collection chamber 17. Alternatively, the fan or pump 6 and the vent holes 8 may be omitted.

In the arrangement shown in FIG. 5, the hair cutting appliance 10 having the hair collection chamber 17 and opening 20 is shown with the comb 100 having the plurality of further comb teeth 132. However, the hair collection chamber 17 and opening 20 described above may be provided on any hair cutting appliance 10, include hair cutting appliances for use with combs not having a third comb portion or further comb teeth.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A comb for a hair cutting appliance, the comb comprising:

a first comb portion defining a comb surface to be held against a user's skin;

a second comb portion comprising a plurality of comb teeth projecting from the first comb portion in a first direction, the first direction having a component in a direction perpendicular to the comb surface, wherein the plurality of comb teeth are spaced apart from one another in a second direction, the second direction being parallel to the comb surface; and a third comb portion comprising one or more further comb teeth extending in a third direction, the third direction having a component in a direction perpendicular to the comb surface, wherein the further comb teeth are arranged on the same side of the comb surface as the comb teeth, and wherein the further comb teeth extend further forwards, in a direction perpendicular to the first and second directions, than the comb teeth and/or the comb teeth extend further rearwards, in the direction perpendicular to the first and second directions, than the further comb teeth, wherein the further comb teeth have a different pitch than a pitch of the comb teeth.

2. The comb of claim 1, wherein each of the further comb teeth is aligned with one of the spaces between the plurality of comb teeth.

3. The comb of claim 1, wherein the further comb teeth are positioned forwards of the comb teeth in the direction perpendicular to the first and second directions.

4. The comb of claim 1, wherein the first and third directions are parallel.

5. The comb of claim 1, wherein cross-sectional shapes of the comb teeth and the further comb teeth are substantially the same.

6. The comb of claim 1, wherein the comb teeth and/or the further comb teeth comprise hair lifting portions extending in a direction parallel to the comb surface.

7. The comb of claim 1, wherein the second comb portion is integrally formed with the first comb portion.

8. The comb of claim 1, wherein the third comb portion is couplable to the first and/or second comb portions.

9. The comb of claim 1, wherein the second comb portion further comprises a connecting bar extending across distal ends of the comb teeth.

10. The comb of claim 1, wherein a gap size between the comb teeth and adjacent ones of the further comb teeth in the second direction is greater than or equal 0.1 mm and less than or equal to 2.5 mm.

11. A hair cutting system comprising:

a hair cutting appliance comprising a plurality of blades for cutting hair; and the comb of claim 1, wherein the comb is couplable to the hair cutting appliance.

12. The hair cutting system of claim 11, wherein the hair cutting appliance comprises a cutting blade and a guard blade, the cutting blade comprising a comb of cutting elements which cooperate with teeth of the guard blade to cut hairs received between the guard blade teeth, wherein the pitch of the comb teeth is substantially equal to a pitch of the teeth of the guard blade.

13. The hair cutting system of claim 11, wherein the hair cutting appliance comprises a body having a wall opposite to the comb teeth and extending in a direction with a component parallel to the first direction, wherein an opening is formed in the wall for receiving hairs cut by the hair cutting appliance wherein a height of the opening in the first direction is approximately equal to the length of the second comb portion in the first direction.

14. A comb for a hair cutting appliance, the comb comprising:

a first comb portion defining a comb surface to be held against a user's skin;

a second comb portion comprising a plurality of comb teeth projecting from the first comb portion in a first direction, the first direction having a component in a direction perpendicular to the comb surface, wherein the plurality of comb teeth are spaced apart from one another in a second direction, the second direction being parallel to the comb surface;

a third comb portion comprising one or more further comb teeth extending in a third direction, the third direction having a component in a direction perpendicular to the comb surface, wherein the further comb teeth are arranged on the same side of the comb surface as the comb teeth, and wherein the further comb teeth extend further forwards, in a direction perpendicular to the first and second directions, than the comb teeth and/or the comb teeth extend further rearwards, in the direction perpendicular to the first and second directions, than the further comb teeth; and wherein the width of each of the further comb teeth in the second direction is approximately equal to the width of the spaces between the comb teeth.

15. The comb of claim 14, wherein each of the further comb teeth is aligned with one of the spaces between the plurality of comb teeth.

16. The comb of claim 14, wherein the further comb teeth are positioned forwards of the comb teeth in the direction perpendicular to the first and second directions.

17. The comb of claim 14, wherein the first and third directions are parallel.

18. The comb of claim 14, wherein cross-sectional shapes of the comb teeth and the further comb teeth are substantially the same.

19. The comb of claim 14, wherein the comb teeth and/or the further comb teeth comprise hair lifting portions extending in a direction parallel to the comb surface.

20. The comb of claim 14, wherein the second comb portion is integrally formed with the first comb portion.

* * * * *